United States Patent

Van Amesfoort

[11] Patent Number: 6,075,970
[45] Date of Patent: Jun. 13, 2000

[54] SATELLITE RECEIVER HAVING A SWITCHABLE POWER SUPPLY

[75] Inventor: Alfonsus M. Van Amesfoort, Eindhoven, Netherlands

[73] Assignee: U.S. Philips Corporation, New York, N.Y.

[21] Appl. No.: 09/251,239

[22] Filed: Feb. 16, 1999

[30] Foreign Application Priority Data

Feb. 16, 1998 [EP] European Pat. Off. ............... 98200475

[51] Int. Cl.[7] ............................... H04H 1/00; H04B 11/12
[52] U.S. Cl. ............................ 455/3.2; 455/131; 343/876; 348/725
[58] Field of Search ................................ 348/730, 725, 348/838, 839; 455/3.1, 3.2, 131; 343/840, 876; 363/40, 41; 364/424.1; 379/399

[56] References Cited

U.S. PATENT DOCUMENTS

| 5,341,179 | 8/1994 | Konishi | 455/3.2 |
|---|---|---|---|
| 5,345,591 | 9/1994 | Tsurumaki et al. | 455/3.2 |
| 5,708,400 | 1/1998 | Morris | 333/12 |
| 5,893,023 | 4/1999 | Vizer | 455/3.2 |
| 5,926,744 | 7/1999 | Fukuzawa et al. | 455/3.2 |
| 5,940,737 | 8/1999 | Eastman | 455/3.2 |
| 5,950,112 | 9/1999 | Hori et al. | 455/3.2 |

OTHER PUBLICATIONS

O. Limann and H. Pelka, "Televisietechniek", pp. 535–555.

*Primary Examiner*—Andrew I. Faile
*Assistant Examiner*—Kieu-Oanh Bui
*Attorney, Agent, or Firm*—Steven R. Biren

[57] ABSTRACT

To control a converter of a satellite receiving system, the converter receives not only a dc voltage but one of two different voltages (normally 13 or 17 volt) also an alternating voltage (normally 22 kHz). It has to be possible to control more equipment along the same (coax) cable like amplifiers and switchers and to switch between more sub-bands than two. To achieve this the satellite receiver includes a power supply unit having switching apparatus which can combine the supplying of one of the two dc voltages with an alternating voltage continuous tone or burst as (switching) information.

6 Claims, 2 Drawing Sheets

SATELLITE RECEIVER HAVING A SWITCHABLE POWER SUPPLY

BACKGROUND OF THE INVENTION

The invention relates to a satellite receiving system as described in the preamble of claim 1.

The invention further relates to a satellite receiver, to a power supply unit for use in a satellite receiving system, and to switching means for use in such a power supply unit.

Such satellite receiving systems are known, for example from the book translated into Dutch "Televisietechniek" from O. Limann and H. Pelka. To receive satellite signals from satellites the satellite receiving system comprises normally a parabolic antenna and a converter to convert the satellite signal to an input signal for a satellite receiver. Such converters are normally called low noise (block) converters (LNC) and convert a frequency band called X-band (and a small part of the so called Ku-band) in the range of from 10 to 13 GHz to frequencies in the so called L-band in the range from 950 to 2150 MHz and further amplifies this signal.

The satellite receiver supplies the converter (located outside the home together with the antenna) from power. Further nowadays it is necessary to switch the reception between horizontal and vertical to receive the signals with both polarisation directions. Further it is necessary to select which part of the X-band has to be converted.

The horizontal/vertical switching is done by switching the power supply between 13 and 17 Volt. The band switching is normally done by whether or not modulating the power supply voltage with a 22 kHz signal.

This complete power supply voltage (comprising real power supply and switching information) is fed, via the tuner in the satellite receiver (Set Top Box) through the same (coax) cable that transmits the so called HF signal from the converter to the satellite receiver, to the converter.

In known solutions of satellite receiving systems which have to be able to switch the converter between different polarisation's, and frequency bands a power coil is used to AC separate the power supply from the output which contains the 22 kHz signal. Further a power 22 kHz generator is coupled to this power coil. The 13/17 volt switching is normally done with the main power supply. These solutions are as a consequence complex and expensive.

Nowadays the need arose to control more equipment along the same (coax) cable like amplifiers and switchers and to switch between more sub-bands than two.

Therefore the European Telecommunication Satellite Organization has made a standard "Digital Satellite Equipment Control" (DiSEqC), Mar. 22, 1996. DiSEqC is backwards compatible with the known 13/17 Volt and 22 kHz switching. In addition it can transmit commands by means of 22 kHz bursts.

Disadvantages of prior art satellite receiving systems are that these are not able to handle the more sophisticated equipment's and that the known systems further are complex and expensive.

SUMMARY OF THE INVENTION

An object of the invention is to provide a satellite receiving system that has not the drawbacks of the known systems and further to provide a simple way of generating a stable 13 or 17 Volt supply voltage whether or not modulated with a continuous tone or burst of 22 kHz. To this end the invention provides a satellite receiving system comprising an antenna for receiving a signal, coupled to a converter for converting the received signal into an input signal for a satellite receiver, which satellite receiver is coupled to a television receiver for displaying the received signal, whereby the satellite receiver comprises a tuning unit and a power supply unit which power supply unit is adapted to supply a supply voltage and control signals via the tuner to the converter, characterized in that the power supply unit comprises switching means for switching the supply voltage between at least two dc values and for combining a dc value selected from said at least two dc values with an alternating signal under control of the tuning unit.

BRIEF DESCRIPTION OF THE DRAWINGS

The invention and additional features which may optionally be used to implement the invention to advantage will be apparent from and elucidated with reference to the examples described hereinafter and shown in the figures. Herein shows.

DETAILED DESCRIPTION OF THE PREFERRED EMBODIMENTS

Figure 1:
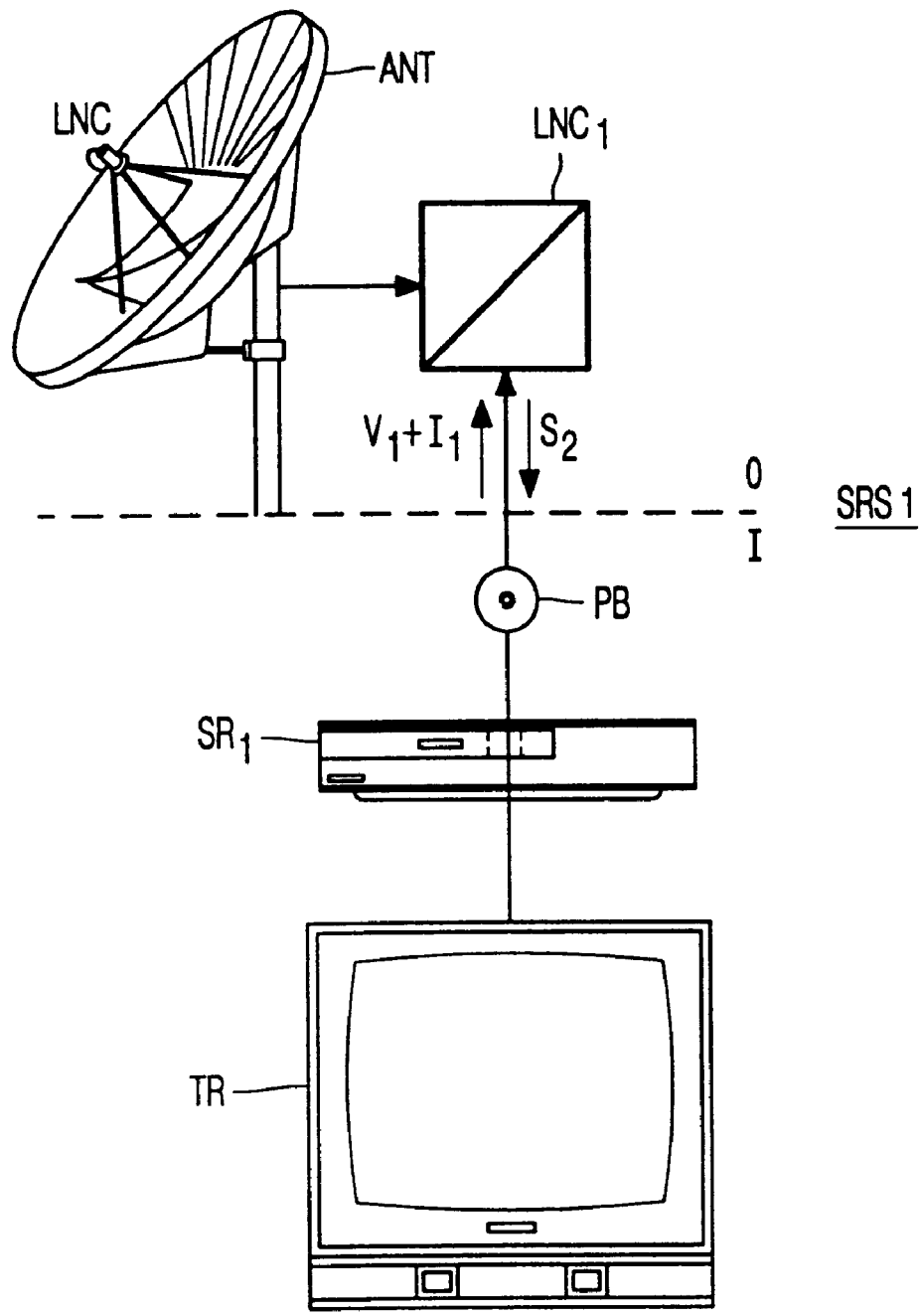
FIG. 1 a block schematic satellite receiving system.

FIG. 1 shows a satellite receiving system SRS for receiving satellite signals. The satellite receiving system comprises an antenna ANT for receiving the satellite signals. The antenna is coupled in this example with a so called low noise (block) converter LNC1. The low noise converter converts a frequency band called X-band (and a small part of the so called Ku-band) in the range from 10 to 13 GHz to frequencies in the so called L-band in the range from 950 to 2150 MHz and further amplifies the signal. The antenna ANT and the low noise converter are usually placed outside (O).

Figure 2:
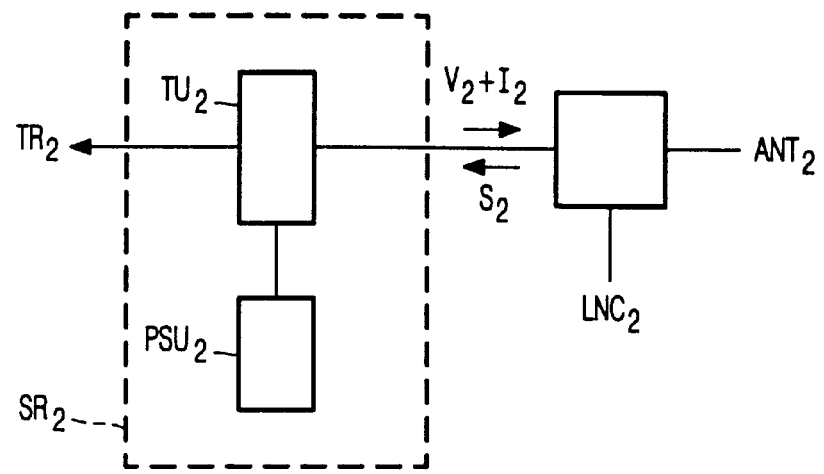
FIG. 2 part of the satellite receiving system according to the invention.

The low noise converter is coupled via a plug box PB to a satellite receiver SR1, which satellite receiver comprises a tuning unit and a power supply unit (see FIG. 2). The satellite receiver is coupled to a television receiver TR for displaying the received signals.

The plug box PB, the satellite receiver SR1 and the television receiver are usually placed inside (I) a building, a caravan, mobile home etc.

The received signal is after being converted and amplified supplied from the converter via the plug box PB to the satellite receiver SRI via a cable (for example coax cable) as so called HF signal S2.

The satellite receiver has to supply the converter LNC1 from power V1 and further from information I1 to switch the converter between different polarisation's and between different frequency bands.

FIG. 2 shows in more detail part of the satellite receiving system SRS1 of FIG. 1. The low noise converter LNC2 receives from the antenna ANT2 the satellite signal, and supplies an amplified and converted signal S2 to the satellite receiver SR2. The satellite receiver comprises a tuning unit TU2 and a power supply unit PSU2. The power supply unit supplies the necessary power V2 via the tuning unit TU2 to the low noise converter LNC2. Further the power supply unit also supplies the low noise converter with a switching signal I2 (control signals) over the same cable (for example a coax cable).

The tuning unit TU2 further operates as is generally known to make displaying the received signals possible at a television receiver TR2.

The satellite receiver is coupled with the tuner TU2 to the television receiver TR2.

Figure 3:
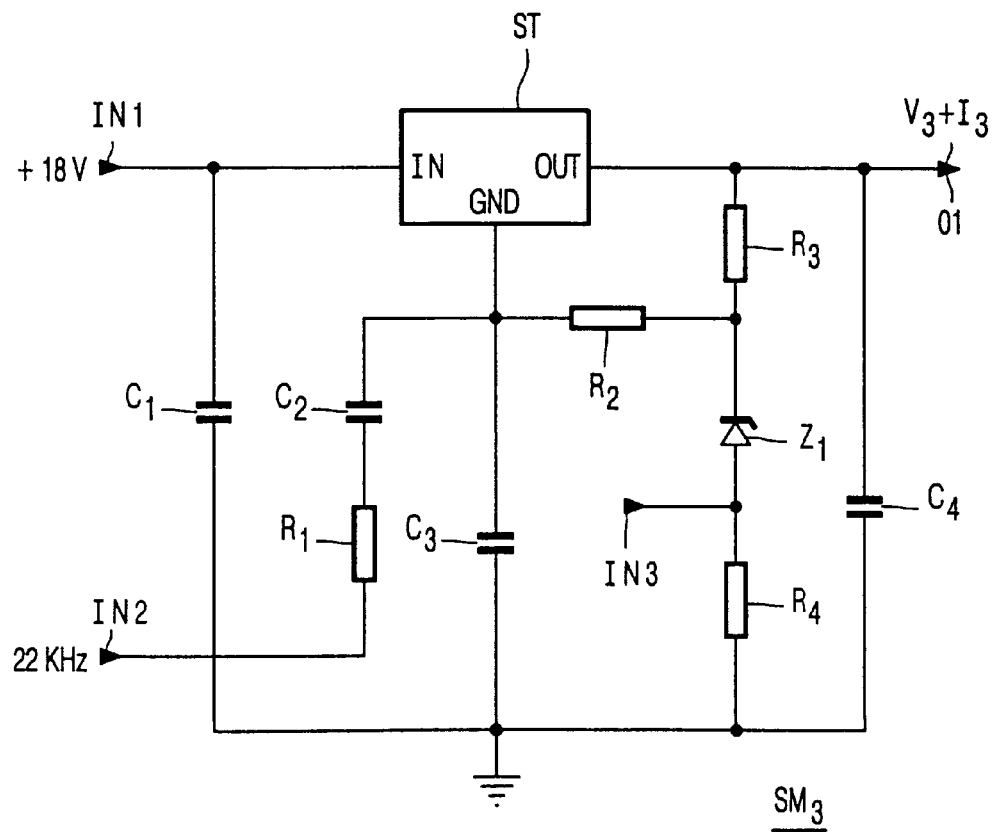
FIG. 3 switching means being part of the power supply.

FIG. 3 shows an example of switching means SM3 for creating the different supply and information signals V3+I3. At a first input IN1 receives the switching means a supply voltage (in this example 18 V). The input IN1 is coupled to an input of a stabiliser ST, which stabiliser supplies at an output an output voltage which is 1.25 V more than the voltage at point GND. The voltage at point GND consists of the addition of 12 V of a zener diode Z1 and the voltage at input IN3, which is chosen to be 0 or 3.3 V of an output of a controller IC (not shown). As a consequence is the output voltage at output O1: 0+12+1.25=13.25 V or 3.3+12+1.25= 16.55 V.

The capacitors C1 and C4 are only storage capacitors respectively at the input and the output of the switching means SM3

At an input IN2 receives the switching means SM3 a tone or tone burst of 22 kHz square wave with an amplitude of 3.3 V. After dividing this 3.3 V 22 kHz signal by resistor R1 and resistor R2 to 0.6 V and DC blocking it by capacitor C2 and shaping it to a sinus like wave form by capacitor C3, resistor R2, and resistor R1 this signal complies with the DiSEqc standard and is superimposed on the DC voltage at the high Ohmic GND pin of the stabiliser ST. The stabiliser also takes care of short circuit protection by internal current limiting and thermic shutdown. This supply solution consists only of cheap components with the exception of the stabiliser.

Instead of the stabiliser one could also use a double (Darlington) transistor or similar and sacrificing some stabilising and circuit protection.

In the above description the idea of the invention has been described on the basis of some examples. The man skilled in the art will be well aware of a lot of different solutions that fall within the scope of the invention concerned.

The switching means can be amended at a lot of ways without changing the operation thereof.

What is claimed is:

1. Satellite receiving system comprising an antenna for receiving a signal, coupled to a converter for converting the received signal into an input signal for a satellite receiver, which satellite receiver is coupled to a television receiver for displaying the received signal, whereby the satellite receiver comprises a tuning unit and a power supply unit which power supply unit is adapted to supply a supply voltage and control signals via the tuner to the converter, characterised in that the power supply unit comprises switching means for switching the supply voltage between at least two dc values and for combining a dc value selected from said at least two dc values with an alternating signal under control of the tuning unit.

2. Satellite receiving system as claimed in claim 1, characterised in that the switching means comprise a stabiliser to stabilise an output voltage of the switching means.

3. Satellite receiving system as claimed in claim 1, characterised in that the switching means are adapted to modulate the alternating signal on the dc value.

4. Satellite receiver for use in a satellite receiving system comprising an antenna for receiving a signal, coupled to a converter for converting the received signal into an input signal for a satellite receiver, which satellite receiver is coupled to a television receiver for displaying the received signal, whereby the satellite receiver comprises a tuning unit and a power supply unit which power supply unit is adapted to supply a supply voltage and control signals via the tuner to the converter, characterized in that the power supply unit comprises switching means for switching the supply voltage between at least two dc values and for combining a dc value selected from said at least two dc values with an alternating signal under control of the tuning unit.

5. Power supply unit for use in a satellite receiver comprising an antenna for receiving a signal, coupled to a converter for converting the received signal into an input signal for a satellite receiver, which satellite receiver is coupled to a television receiver for displaying the received signal, whereby the satellite receiver comprises a tuning unit and a power supply unit which Power supply unit is adapted to supply a supply voltage and control signals via the tuner to the converter, characterized in that the power supply unit comprises switching means for switching the supply voltage between at least two dc values and for combining a dc value selected from said at least two dc values with an alternating signal under control of the tuning unit.

6. Switching means for use in a power supply unit for use in a satellite receiver comprising an antenna for receiving a signal, coupled to a converter for converting the received signal into an input signal for a satellite receiver, which satellite receiver is coupled to a television receiver for displaying the received signal, whereby the satellite receiver comprises a tuning unit and a power supply unit which power supply unit is adapted to supply a supply voltage and control signals via the tuner to the converter, characterized in that the power supply unit comprises switching means for switching the supply voltage between at least two dc values and for combining a dc value selected from said at least two dc values with an alternating signal under control of the tuning unit.

* * * * *